United States Patent
Krestel

(10) Patent No.: US 8,970,167 B2
(45) Date of Patent: Mar. 3, 2015

(54) VEHICLE CHARGING INDUCTION LOOP INCORPORATED INTO SECTION OF ROADWAY IN PROXIMITY TO TRAFFIC STOP LOCATIONS

(75) Inventor: Richard Krestel, Leonberg (DE)

(73) Assignee: Dr. Inc. H.C. F. Porsche Aktiengesellschaft, Stuttgart (DE)

( * ) Notice: Subject to any disclaimer, the term of this patent is extended or adjusted under 35 U.S.C. 154(b) by 424 days.

(21) Appl. No.: 13/310,864

(22) Filed: Dec. 5, 2011

(65) Prior Publication Data

US 2012/0146578 A1  Jun. 14, 2012

(30) Foreign Application Priority Data

Dec. 14, 2010  (DE) .......................... 10 2010 061 216

(51) Int. Cl.
*H01M 10/46* (2006.01)
*B60M 7/00* (2006.01)
*B60L 11/18* (2006.01)

(52) U.S. Cl.
CPC .............. *B60M 7/003* (2013.01); *B60L 11/182* (2013.01); *B60L 11/1833* (2013.01); *B60L 11/1824* (2013.01); *B60L 11/1846* (2013.01); *B60L 2200/36* (2013.01); *Y02T 10/7088* (2013.01); *Y02T 10/7005* (2013.01); *Y02T 90/125* (2013.01); *Y02T 90/14* (2013.01); *Y02T 90/122* (2013.01); *Y02T 90/163* (2013.01); *Y02T 90/169* (2013.01); *Y02T 90/128* (2013.01); *Y04S 30/14* (2013.01)

USPC ........................................................ 320/108

(58) Field of Classification Search
USPC .................................. 320/107, 108, 109, 132
See application file for complete search history.

(56) References Cited

U.S. PATENT DOCUMENTS

| 5,207,304 A | 5/1993 | Lechner et al. |
|---|---|---|
| 6,114,834 A | 9/2000 | Parise |
| 2010/0231163 A1* | 9/2010 | Mashinsky .................... 320/108 |
| 2010/0235006 A1 | 9/2010 | Brown |
| 2010/0259108 A1 | 10/2010 | Giler et al. |

FOREIGN PATENT DOCUMENTS

| DE | 10 2007 033 654 | 4/2008 |
|---|---|---|
| JP | 2010193657 | 9/2010 |
| JP | 2010268661 | 11/2010 |
| WO | 95/30556 | 11/1995 |

OTHER PUBLICATIONS

PKW Kabellos Laden Kabellos Ianden: Neue Technik fur Elektroautos—Induktionsprinzip—Oct. 9, 2009.

* cited by examiner

*Primary Examiner* — Edward Tso
(74) *Attorney, Agent, or Firm* — Gerald E. Hespos; Michael J. Porco; Matthew T. Hespos

(57) ABSTRACT

A section of roadway has at least one integrated induction loop designed to inductively charge a vehicle battery of a hybrid or electric vehicle that is situated on the induction loop. The section of roadway is arranged in the region of a road in which the traffic is at least temporarily stationary. As a result, useless time waiting at traffic lights or railway crossing gates can be used productively.

5 Claims, 1 Drawing Sheet

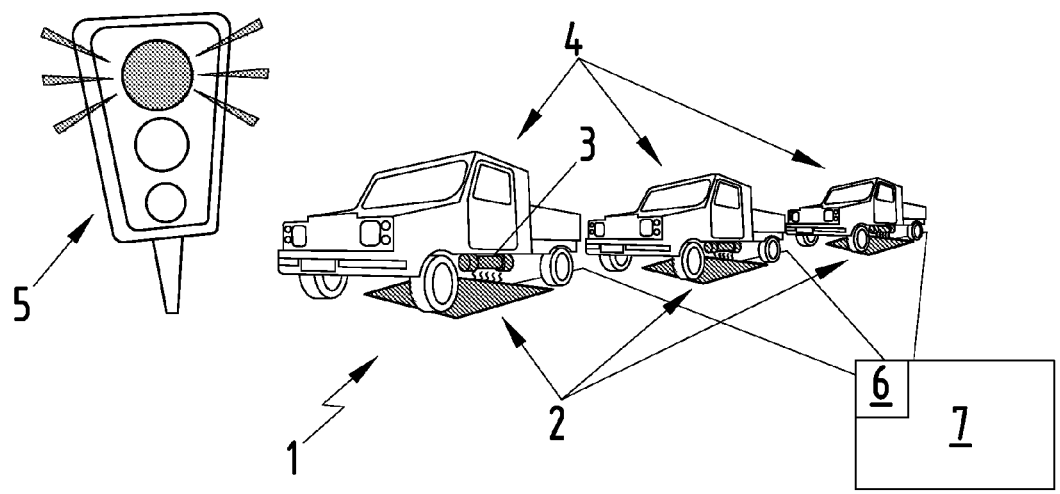

VEHICLE CHARGING INDUCTION LOOP INCORPORATED INTO SECTION OF ROADWAY IN PROXIMITY TO TRAFFIC STOP LOCATIONS

CROSS REFERENCE TO RELATED APPLICATION

This application claims priority under 35 USC 119 to German Patent Application No. 10 2010 061 216.2, filed on Dec. 14, 2010 the entire disclosure of which is incorporated herein by reference.

BACKGROUND OF THE INVENTION

1. Field of the Invention

The invention relates to a section of roadway having at least one integrated induction loop. The invention also relates to a hybrid or electric vehicle having a rechargeable vehicle battery.

2. Description of the Related Art

The range of electric vehicles is limited and the electric vehicles must be recharged at so-called electric filling stations on a periodic basis. To this end, the electric vehicle requires a plug that can be inserted into a corresponding coupling at the electric filling station. However, it is difficult to find suitable electric filling stations, particularly when crossing international borders. Even within the EU each country has different electrical plug systems. This can be remedied only by adapters that match the plug systems.

U.S. Pat. No. 6,114,834 discloses an electric vehicle with a charging device that can be operated inductively so that electrical energy can be transmitted to the charging device of the electric vehicle in a wire-free manner by charging poles. The electric vehicle and the charging poles can additionally exchange a code, for example to bill for the amount of energy received when filling up with electrical energy.

U.S. Pat. No. 5,207,304 discloses an electric vehicle that obtains its electrical energy by induction from induction loops that are laid in a roadway.

DE 10 2007 033 654 A1 discloses a system that comprises a car and at least one base unit. The car has a secondary coil that can be coupled inductively to a primary conductor of the base unit. The base unit also has a movement apparatus for reducing the distance between the primary conductor and the secondary coil.

WO 95/30556 discloses an electric vehicle that can wirelessly receive electrical energy by induction loops integrated in the roadway for driving purposes or for storage in a vehicle battery.

The invention is concerned with the problem of being able to make electric and hybrid vehicles suitable for everyday use.

SUMMARY OF THE INVENTION

The invention relates to making hybrid and electric vehicles more suitable for everyday use by having a vehicle battery of the electric or hybrid vehicle charged at least partly in regions in which the electric or hybrid vehicle usually is delayed and, in particular, at stops. To this end, a section of roadway according to the invention has at least one integrated induction loop that is designed for inductively charging the vehicle battery of a hybrid or electric vehicle when the vehicle which is situated on the induction loop. The section of roadway additionally is arranged in a region in which the traffic is temporarily stationary, for example, in a region in front of a traffic light or in front of a railway crossing gate. Specifically, waiting times occur on a periodic basis at traffic lights or railway crossings. These waiting times at traffic lights or railway crossing gates are used in accordance with the invention to charge the vehicle battery of the hybrid or electric vehicle waiting. As a result, the waiting time in front of the traffic lights or at the railway crossing can be used meaningfully and, at the same time, the range of electric vehicles can be increased considerably. The hybrid or electric vehicle does not have to be plugged into a plug socket to charge the vehicle battery while waiting at the traffic light or at the railway crossing, but rather merely is situated over induction loops in the roadway. Thus, the charging process is extremely convenient for the driver of the hybrid or electrical vehicle. Distributing sections of the inventive roadway over an area can reduce the charging time spent at electrical filling stations considerably and thereby significantly increase the suitability of the hybrid or electric vehicle for everyday use.

A detection device preferably is provided to identify whether there is a hybrid or electric vehicle on the induction loop. The detection device optionally can detect a state of charge of the vehicle battery of the hybrid or electric vehicle that has stopped on the induction loop. Therefore, the inductive energy transmission operation is started only if the detection device identifies that a hybrid or electric vehicle with a corresponding charging device is situated on the induction loop. In the process, the detection device can detect the state of charge of the vehicle battery and activate the electrical energy transmission means only if such activation is required due to the detection of the state of charge.

The detection device preferably is connected to and communicates with the traffic light or the gate and is activated only when the traffic light is red or the gate is closed. Thus, energy can be saved during operation of the section of roadway since the detection device is activated and electrical energy is consumed only when the traffic light is red or the railway crossing gate is closed.

The above-described features and those explained in the text which follows can be used both in the indicated combinations and also in other combinations or on their own, without departing from the scope of the invention.

BRIEF DESCRIPTION OF THE DRAWING

FIG. 1 shows a possible installation situation of the section of roadway according to the invention.

DETAILED DESCRIPTION OF THE PREFERRED EMBODIMENT

A section 1 of roadway according to the invention is identified by the numeral 1 in FIG. 1 and has a plurality of integrated induction loops 2 designed for inductively charging a vehicle battery 3 of a hybrid or electric vehicle 4 that is situated on the induction loops. The section 1 of roadway is arranged in the region of a road at which the traffic is at least temporarily stationary. A section 1 of roadway of this kind can have a traffic light 5 or a gate, such as a railway crossing gate, for example at its front-most end. Traffic can be expected to stop at such sections 1 of roadway and therefore hybrid or electric vehicles 4 can be expected to be stationary on a periodic basis. The induction loops 2 are arranged one behind the other. The vehicle batteries 3 of the hybrid or electric vehicles are charged during a waiting time that otherwise passes to no effect, and the hybrid or electric vehicles are provided with a greater range and improved suitability for everyday use as a result.

A detection device 6 also expediently can be provided and may be a constituent part of a charging device 7 for identifying whether there is a hybrid or electric vehicle 4 on the induction loop 2. In this case, power is supplied to the induction loops 2 only when there actually is a hybrid or electric vehicle 4 on the induction loop 2. The detection device 6 also optionally can detect a state of charge of the vehicle battery 3 of the hybrid or electric vehicle 4 that has stopped on the induction loop 2, and therefore the vehicle battery 3 is charged as a function of the state of charge.

The detection device 6 also can be connected to the traffic light 5 or the gate so as to communicate with the traffic light 5 or the gate, and to be activated only when the traffic light 5 is red or the gate is closed. Thus, energy can be saved, since predefined conditions have to be met to activate the detection device and/or the charging device 7. The invention also comprises a hybrid or electric vehicle 4 having a rechargeable vehicle battery 3. The hybrid or electric vehicle 4 is designed to receive energy wirelessly from the section 1 of roadway.

In general, it is possible to use the hybrid or electric vehicle 4 and the associated section 1 of roadway to inductively charge the vehicle battery 3 without direct connection via a cable. The vehicle battery 3 can be charged during a waiting situation, for example at a red traffic light 5, without this charging operation being noticed by the driver of the hybrid or electric vehicle 4. As a result, the range and the suitability of such hybrid or electric vehicles 4 for everyday use can be increased.

What is claimed is:

1. A section of roadway comprising: a traffic light or a railway crossing gate; at least one integrated induction loop being arranged in a region of the section of roadway in front of the traffic light or the railway crossing gate at which the traffic is at least temporarily stationary; a detection device for detecting when the traffic light or the railway crossing gate is stopping traffic and for detecting a presence of a hybrid or electric vehicle on the induction loop, the detection device further being configured to cause the induction loop to start inductive energy transmission only if the traffic light or the railway crossing gate is stopping traffic and if a hybrid or electric vehicle is on the induction loop.

2. The section of roadway of claim 1, wherein the section of roadway has a plurality of induction loops arranged one behind the other for inductively charging a plurality of hybrid or electric vehicles.

3. The section of roadway of claim 2, wherein the detection device further has an identifier for identifying whether the hybrid or electric vehicle on the induction loop has a charging device that can be charged by the induction loop.

4. The section of roadway of claim 3, wherein the detection device detects a state of charge of the vehicle battery, which may possibly require charging, and a position of the hybrid or electric vehicle that has stopped on the induction loop.

5. The section of roadway of claim 1, wherein the detection device is connected communicatively to the traffic light or to the gate and is activated only when the traffic light is red or the gate is closed.

* * * * *